No. 873,373. PATENTED DEC. 10, 1907.
R. HÜBNER.
HORSESHOE.
APPLICATION FILED APR. 5, 1906.
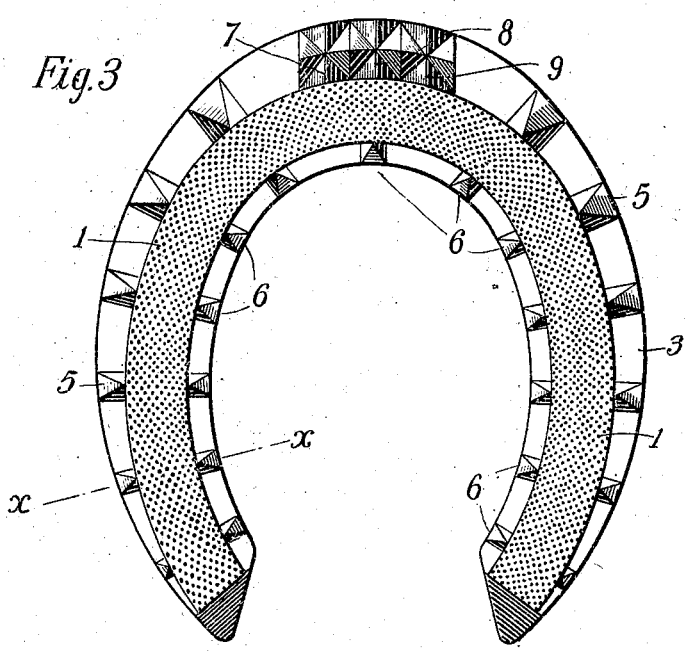
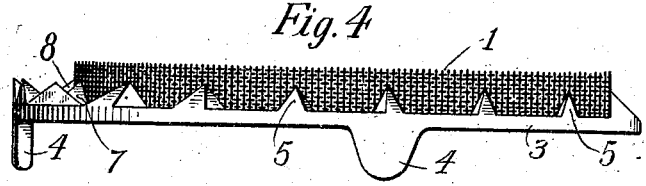
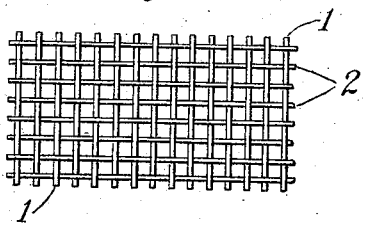
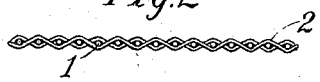
Witnesses
Raphael Netter
W. A. Pauling
Inventor
Robert Hübner
By his Attorneys
Gifford & Bull

UNITED STATES PATENT OFFICE.

ROBERT HÜBNER, OF NEW YORK, N. Y.

HORSESHOE.

No. 873,373.     Specification of Letters Patent.     Patented Dec. 10, 1907.

Application filed April 5, 1906. Serial No. 309,978.

*To all whom it may concern:*

Be it known that I, ROBERT HÜBNER, a subject of the Emperor of Germany, and a resident of the city of New York, borough of Manhattan, in the county and State of New York, have invented a new and useful Improvement in Horseshoes, of which the following is a specification.

The object of this invention is to provide a non-slipping horseshoe and it consists in such construction that the horse will, as it were, stand upon the points of a brush of proper construction so that the points of the brush will maintain substantially their position point-wise to the ground supporting the horse.

It also consists of the features of construction hereinafter more particularly described.

In the accompanying drawings, Figure 1 is a side view of a portion of the brush detached from the horseshoe in the form in which I prefer to construct it. Fig. 2 is a plan or edge view of the same. Fig. 3 is a bottom view of the horseshoe in its preferred form containing the brush. Fig. 4 is a side view of the same and Fig. 5 is a cross section on the line x, x of Fig. 3.

The so-called brush is composed of vertical wires 1, of such size, material and closeness of arrangement that they will maintain substantially their point-wise-to-the-ground position under the weight of the horse and the blows to which they are subjected. The material of which I prefer to make them is cold drawn steel piano wire, and I prefer to unite them by weaving across them a filler of wire 2, so that the vertical wires remain straight and the bends necessary for the weaving operation are substantially confined to the filler wires which act as a brace or support between the individual vertical wires 1. The material of which the filler wires 2 are composed is of less importance, although the filler wires may be composed of the same material as the vertical wires.

I have obtained good results for the shoes of a horse of average weight by constructing the brush of vertical wires consisting of cold drawn steel piano wire of a size between No. 6 (.0157 inches diameter) and No. 12 (.0283 inches diameter) joined together by a filler of smaller wire, say from No. 5 (.0138 inches in diameter) to No. 6 (.0157 inches in diameter), the brush being embedded in the shoe, as hereinafter described.

I prefer to construct the horseshoe as follows: 3 is a plate which, on its upper side, is provided with any suitable or customary projections 4, to enable it to better fit the horse's hoof. On the bottom of this plate, is provided the bed or recess within which the brush is to be held and which I prefer to form between two rows of downward projections located, respectively, along the outer and inner edges of the plate 3. These rows of projections are designated, respectively, 5, 5, 5 etc. and 6, 6, 6 etc. and each individual projection is preferably pointed as distinct from a calk; the opposing surfaces of the two sets of projections being preferably made slightly inclined toward each other from the vertical. Thus, a space is formed between the two sets of projections 5 and 6 for the reception of the brush, which brush is preferably but not necessarily continuous. This brush projects below the projections 5, 6, when the shoe is new and when the brush wears down to the level of the projections 5, 6, the projections, being of softer metal than the brush, will wears away, at least equally as fast as the brush so as to continue the support of the animal substantially upon the points of the brush.

At the forward end of the shoe where a so-called toe-calk is occasionally provided, I may arrange a series of closely set projections 7, 8, 9, in line with the outer series of projections 5. These projections may be produced by two sets of diagonal grooves crossing so that the three sets of points 7, 8, 9, break joints with each other, as shown.

In making the brush, the filler wires are interwoven with each row of vertical wires separately, thus forming each row of vertical wires, as it were, in a separate fabric. A sufficient number of these fabrics are then placed together to fill the groove of the horseshoe and bent into the form of the horseshoe groove so that the filler wires extend continuously around the groove from heel to heel in horizontal position. The brush is then placed in the groove of the horseshoe and the points or rims binding the groove are bent toward each other sufficiently to clamp the brush and hold it.

Although I have shown and described in detail both the bed in the shoe itself and the horizontal wires whereby the members of the brush are maintained in vertical position, I do not wish to be understood as limiting myself to the particular means described for this purpose since I understand that I am the first one to support the animal substantially upon the points of a brush adapted for maintaining itself under his weight.

The circumferential extent of each of the projections 5 and 6 will be varied to suit the kind of wear to which the shoe will be subjected; in fact, the projections 5 may not be disconnected from each other but may collectively constitute a flange extending continuously around the shoe and the same may be said of the projections 6. The extent to which the brush projects below the projections when new will also be dependent upon conditions of use and of course such projections will decrease with wear until the points of the brush will be nearly on a level with the points of the projections.

Having thus described my invention, I claim as new and desire to secure by Letters Patent:

1. In a horse shoe, a brush composed of substantially vertical wires, retaining wires horizontally arranged and interlaced therewith, whereby the first named wires are firmly fixed in place but otherwise free to move, and means adapted to clamp upon and hold the brush in place.

2. In a horseshoe, a brush composed of substantially vertical wires, retaining wires horizontally arranged and interlaced therewith, whereby the first named wires are firmly fixed in place but otherwise free to move, and a series of downwardly extending projections between which the brush is clamped and held in place.

3. A horse shoe comprising a plate provided along its inner edge with a series of spaced pyramidal projections, having substantially vertical inner and tapering outer faces with flat spaces between them and along its outer edge with spaced pyramidal projections, having vertical inner and tapering outer faces, with flat spaces between them and a toe plate, consisting of rows of teeth breaking joints and located in line with the outer series of projections opposite one or more projections of the inner series, all arranged to operate with the continuous single filling or pad as described.

In testimony whereof I have hereunto signed my name in the presence of two subscribing witnesses.

ROBERT HÜBNER.

Witnesses:
NORMAN B. BEECHER,
GEORGE M. CLARKE.